United States Patent [19]

de Hair et al.

[11] Patent Number: 4,602,188

[45] Date of Patent: Jul. 22, 1986

[54] LOW-PRESSURE MERCURY VAPOR DISCHARGE LAMP

[75] Inventors: Johannes T. W. de Hair; Johannes T. C. van Kemenade, both of Eindhoven; Everhardus G. Berns, Geldrop, all of Netherlands

[73] Assignee: U.S. Philips Corporation, New York, N.Y.

[21] Appl. No.: 518,495

[22] Filed: Jul. 29, 1983

[30] Foreign Application Priority Data

Jul. 30, 1982 [NL] Netherlands ........................ 8203040

[51] Int. Cl.[4] ...................... C09K 11/475; H01J 61/48

[52] U.S. Cl. ............................ 313/487; 252/301.4 R; 252/301.4 P; 252/301.6 R; 252/301.6 P

[58] Field of Search .............................. 313/486, 487; 252/301.4 R, 301.4 H, 301.4 P, 301.6 R, 301.6 P

[56] References Cited

U.S. PATENT DOCUMENTS

| | | | |
|---|---|---|---|
| 3,937,998 | 2/1976 | Verstegen et al. | 313/487 |
| 4,176,299 | 11/1979 | Thornton, Jr. | 313/487 |
| 4,315,192 | 2/1982 | Skiwirt | 313/487 |
| 4,319,161 | 3/1982 | Looye et al. | 252/301.4 R |

FOREIGN PATENT DOCUMENTS

| | | | |
|---|---|---|---|
| 56-41669 | 4/1981 | Japan | 313/486 |

*Primary Examiner*—Kenneth M. Schor

*Attorney, Agent, or Firm*—Norman N. Spain

[57] ABSTRACT

A low-pressure mercury vapor discharge lamp having a satisfactory color rendition (Ra≧80), a color temperature of 2800° K. or higher and a color point on or near the Planckian locus. The lamp is provided with a luminescent layer (4) which comprises a. a luminescent rare earth metal metaborate activated by Ce and Mn and having a fundamental lattice $Ln(Mg,Zn,Cd)B_5O_{10}$, where Ln represents the elements Y, La and/or Gd, which borate exhibits red Mn emission, b. a luminescent material activated by $Tb^{3+}$ and having green $Tb^{3+}$ emission, c. at least one luminescent halophosphate of the group which comprises the calcium halophosphates emitting white light, activated by $Sb^{3+}$ and $Mn^{2+}$ and having a color temperature of at least 2900° K. and blue-luminescing calcium halophosphate activated by $Sb^{3+}$.

The lamps yield a satisfactory rendition of deep red colors (R9≧60) and have a high luminous flux and a high maintenance of the luminous flux during the life.

5 Claims, 3 Drawing Figures

LOW-PRESSURE MERCURY VAPOR DISCHARGE LAMP

BACKGROUND OF THE INVENTION

The invention relates to a low-pressure mercury vapour discharge lamp having a satisfactory colour rendition, a colour temperature of the emitted white light of at least 2800 K. and a colour point ($x_L$, $y_L$) on or near the Planckian locus or curve, provided with a gas-tight radiation-envelope which contains mercury and a rare gas, and provided with a luminescent layer containing a luminescent halophosphate.

The expression "a satisfactory colour rendition" is to be understood to mean in the present description and the appended claims that the average colour rendering index Ra (average value of the rendering indices of eight test colours, as defined by the "Commission Internationale d'Eclairage"; Publication CIE No. 13.2 (TC-3.2), 1974) is at least 80.

The colour of visible radiation is characterized by the colour coordinates (x,y) which determine the colour point in the colour triangle (cf. publication CIE No. 15 (E-1.3.1), 1971). Lamps for general illumination purposes should emit light which can be considered to be "white". White radiation is found in the colour triangle at colour points located on the Planckian locus. This curve, also designated as curve of the black radiators and denoted hereinafter as the curve P, comprises the colour points of the radiation emitted by a completely black body at different temperatures (the so-called colour temperature). As the colour temperature of white radiation increases, the x-coordinate and, from a colour temperature of approximately 2500 K. also the y-coordinate, of the colour point have a smaller value. A given colour temperature is alotted not only to a given point on the curve P but also to radiation with colour coordinates located on a line intersecting the curve P at this point (see the said publication CIE No. 15). If this radiation has a colour point near the curve P, this radiation is also considered to be white light having this given colour temperature. In the present description and appended claims the expression "a colour point near the curve P" is to be understood to mean that the distance from the colour point to the point on the curve P with the same colour temperature is at most 20 MPCD. MPCD (Minimum Perceptible Colour Difference) is the unit of colour difference; see the publication of J. J. Rennilson in "Optical Spectra", October 1980, p. 63.

A large number of embodiments of low-pressure mercury vapour discharge lamps which have been known for may years and are still frequently used, comprise a luminescent material of the group of the alkaline earth metal halophosphates activated by $Sb^{3+}$ and $Mn^{2+}$. These lamps have the advantage that they are inexpensive and emit a satisfactorily high luminous flux. A great disadvantage of these lamps, however, is that their colour rendition properties leaves much to be desired. In general, they have Ra values of the order of 50 to 60 and only for lamps with a high colour temperature (for example, 5000 K.) is an Ra attained of approximately 75, which is not considered to be a satisfactory colour rendition.

For a long time, lamps have been known with which a satisfactory to very satisfactory colour rendition is obtained and which are provided with special luminescent materials. These lamps contain a tin-activated red-luminescing material on the basis of a strontium orthophosphate host, generally in combination with a blue-emitting halophosphate activated by $Sb^{3+}$, in particular such as a strontium halophosphate. The said strontium orthophosphate luminesces in a very broad band which extends into the deep red. These known lamps have the disadvantages connected with the use of the said strontium-containing luminescent materials of exhibiting a comparatively small luminous flux and of a poor maintenance of luminous flux during life of the lamp. It has been found that the latter disadvantage renders it substantially impossible to use these materials in practice at a higher load by the radiation emitted by the mercury discharge.

It is true that high luminous fluxes and a satisfactory colour rendition can be obtained with lamps comprising three luminescent materials which emit in three comparatively narrow bands (cf. Dutch Patent Specification No. 164,697 (PHN. 7137)). Although these lamps have a high Ra value, certain colours are reproduced less satisfactorily due to the lack of red radiation having wavelengths above 620 nm. This becomes manifest in particular in a low value of R9 (rendering index for the deep red test colour No. 9).

If a high value of R9 is to be attained, a certain contribution in the red above 620 nm is necessary in the spectrum of the emitted radiation of a low-pressure mercury vapour discharge lamp. This is also the case with higher values of the colour temperature of the emitted radiation, although the required red contribution is larger as the colour temperature is lower. Inter alia for this reason the said tin-activated strontium orthophosphate was used in the aforementioned lamps having a satisfactory to very satisfactory colour rendition. For this material has an emission maximum at approximately 625 nm and a half value width of the emission band of approximately 150 nm so that the spectrum is filled satisfactorily also in the deep red.

SUMMARY OF THE INVENTION

The invention has for its object to provide low-pressure mercury vapour discharge lamps having a satisfactory colour rendition and in particular with an R9 of at least 60, which does not have the said disadvantages of the known lamps.

Therefore, according to the invention, a low-pressure mercury vapor discharge lamp of the kind mentioned in the preamble is characterized in that the luminescent layer comprises a. a luminescent rare earth metal metaborate activated by trivalent cerium and by bivalent manganese and having a monoclinic crystal structure, whose fundamental lattice corresponds to the formula $Ln(Mg,Zn,Cd)B_5O_{10}$, in which Ln represents at least one of the elements yttrium, lanthanum and gadolinium and in which up to 20 mol.% of the B may be replaced by Al and/or Ga and which metaborate exhibits red $Mn^{2+}$ emission, b. a luminescent material which is activated by trivalent terbium and exhibits green $Tb^{3+}$ emission, and c. at least one luminescent halophosphate of the group which comprises the calcium halophosphates activated by trivalent antimony and by bivalent manganese, and emitting white light and whose colour temperature of the emitted radiation is at least 2900 K. and blue-luminescing calcium halophosphates activated by trivalent antimony.

Experiments which have led to the invention have shown surprisingly that a high value of R9 can also be obtained with an emission having a considerably narrower band than that of the known luminescent strontium orthophosphate, but whose maximum of the emission lies at substantially the same site. It has been found that the emission of rare earth metal metaborates activated by $Ce^{3+}$ and $Mn^{2+}$ is particularly suitable for this purpose. These metaborates are known per se and are further described in the Dutch Patent Applications No. 7905680 (PHN.9544) and No. 8100346 (PHN.9942). These metaborates have a fundamental lattice having a monoclinic crystal structure with a chemical composition according to the formula $Ln(Mg,Zn,Cd)B_5O_{10}$ where Ln is at least one of the elements Y, La and Gd. In the borate up to 20 mol.% of the B may be replaced by Al and/or Ga, which, like the choice of the elements Mg, Zn and/or Cd, hardly influences the luminescent properties. The Ce activator is incorporated at an Ln site (and may even occupy all the Ln sites) and absorbs the exciting radiation energy (mainly 254 nm in a low-pressure mercury vapour discharge lamp) and transfers the latter to the Mn activator which is incorporated at an Mg (and/or Zn and/or Cd) site. These borates exhibit a very efficient emission originating from $Mn^{2+}$ in a band having a maximum at approximately 630 nm and a half width value of approximately 80 nm.

A great advantage of the use of these metaborates in a lamp according to the invention is that inter alia due to the comparatively small quantity of radiation energy in the deep red part of the spectrum, high luminous fluxes can be obtained. It has further been found that these metaborates exhibit a very favourable lamp behaviour. This means that they retain their favourable luminescent properties when they are employed in a lamp and that they exhibit only a small decline of the luminous flux during the life of the lamp. This is also the case in a lamp with a comparatively high radiation load, for example, in lamp having a small diameter of, for example, 24 mm. It should be noted that the use of the known luminescent strontium orthophosphate is in practice generally limited to lamps having a large diameter (36 mm), due to the high decline of the luminous flux, in particular with a heavy load.

The invention is based on the further recognition of the fact that with these metaborates not only high values for R9 can be obtained, but that also a satisfactory general colour rendition (Ra at least 80) is possible if in the luminescent layer of the lamp the metaborate (the material a) is combined with second and third luminescent materials (the materials b and c, respectively). The material b should be a green-luminescing material activated by trivalent terbium, while the material c should be at least a luminescent halophosphate of the group of calcium halophoshates emitting white light and activated by $Sb^{3+}$ and $Mn^{2+}$ and having a colour temperature of at least 2900 K. and blue-luminescing calcium halophosphates activated by $Sb^{3+}$. The combination of suitable quantities of only the red $Mn^{2+}$ emission of the metaborate and the green $Th^{3+}$ emission (the materials a and b) yields in a lamp a radiation having a very low colour temperature (approximately 2850 K. at a colour point on the curve P). Such a lamp has an Ra value of 80 and the value of R9 is also approximately 80. It could not be expected that when a luminescent calcium halophosphate (group c) is added to such a combination, lamps could be obtained having any colour temperature used in practice for general illumination purposes from 2800 K., the high Ra value of 80 being maintained or even being considerably exceeded and the very high value of R9 decreasing only slightly (to at least 60) or even being maintained. In fact, these halophosphates when used alone in lamps yield Ra values of 50 to at most approximately 75 and values for R9 which are even negative (for example, −40 to −110).

The use of luminescent materials activated by $Tb^{3+}$ has the advantage that such green-luminescing materials are generally very efficient and contribute strongly to the luminous flux emitted by the lamp. As the material b, use can advantageously be made of, for example, the known cerium magnesium aluminates activated by Tb (see Dutch Patent Specification No. 160.869 (PHN 6604)) or cerium aluminates (see Dutch Patent Application No. 7216765 (PHN 6654)), which aluminates have a hexagonal crystal structure akin to magnetoplumbite. Also very suitable is a Ce- and Tb-activated metaborate, whose fundamental lattice is the same as that of the metaborates exhibiting a red $Mn^{2+}$ emission (material a). In these known borates (see the aforementioned Dutch Patent Application No. 7905680 and No. 8100346) Ce and Tb are incorporated at an Ln site and the exciting radiation is absorbed by the cerium and transferred to the terbium activator. The said Tb-activated materials all have the advantage that they exhibit a very favourable lamp behaviour and especially have a high maintenance of their high luminous flux during the operation of the lamps. An advantage connected with the use of the luminscent calcium halophosphates (as material c) is that they also exhibit a favourable lamp behaviour. They especially have a higher maintenance of the luminous flux during the life of the lamp, particularly with a heavier load, than, for example, the luminescent strontium halophosphates and strontium orthophosphates. A further advantage of the calcium halophosphates is that they can be obtained with any desired colour temperature of the emitted radiation (from approximately 2900 K.), for example, by the use of mixtures of two halophosphates having different colour temperatures. Thus, an optimization of the lamps according to the invention can be very readily obtained, which will be further explained hereinafter.

An embodiment of a lamp according to the invention which is preferred is characterized in that the luminescent metaborate a is further activated by trivalent terbium, the metaborate a being at the same time the material b and corresponding to the formula $$(Y,La,Gd)_{1-x-y}Ce_xTb_y(Mg,Zn,Cd)_{1-p}Mn_pB_5O_{10},$$

in which $$0.01 \leqq x \leqq 1-y$$

$$0.01 \leqq y \leqq 0.75$$

$0.01 \leq P \leq 0.30$ and in which up to 20 mol.% of the B may be replaced by Al and/or Ga. This lamp has the great advantage that both the red $Mn^{2+}$ emission and the green $Tb^{3+}$ emission are supplied by one luminescent material. Thus, the manufacture is of course simplified considerably because only two luminescent materials are required instead of three. For example, homogeneous luminescent layers can be formed more readily because demixing problems can occur to a considerably smaller extent. In these lamps, the desired relative red $Mn^{2+}$ contribution and green $Tb^{3+}$ contribution can be adjusted by varying the concentrations of Mn and Tb in the metaborate. It will be apparent hereinafter that the magnitude of the said relative contributions depends upon the desired colour point of the lamp and upon the calcium halophosphate used. Now it is readily possible to prepare and to optimize a single luminescent metaborate, whose ratio between the $Mn^{2+}$ emission and the $Tb^{3+}$ emission has a value in the proximity of the desired average value, and to carry out, if necessary, a correction for a given lamp application (dependent upon the desired colour point or colour temperature and the calcium halophosphate used) with either a small quantity of the Ce- and Mn-activated metaborate or a small quantity of a Tb-activated luminescent material (for example, Tb-activated cerium magnesium aluminate or Ce- and Tb-activated metaborate).

Figure 2:
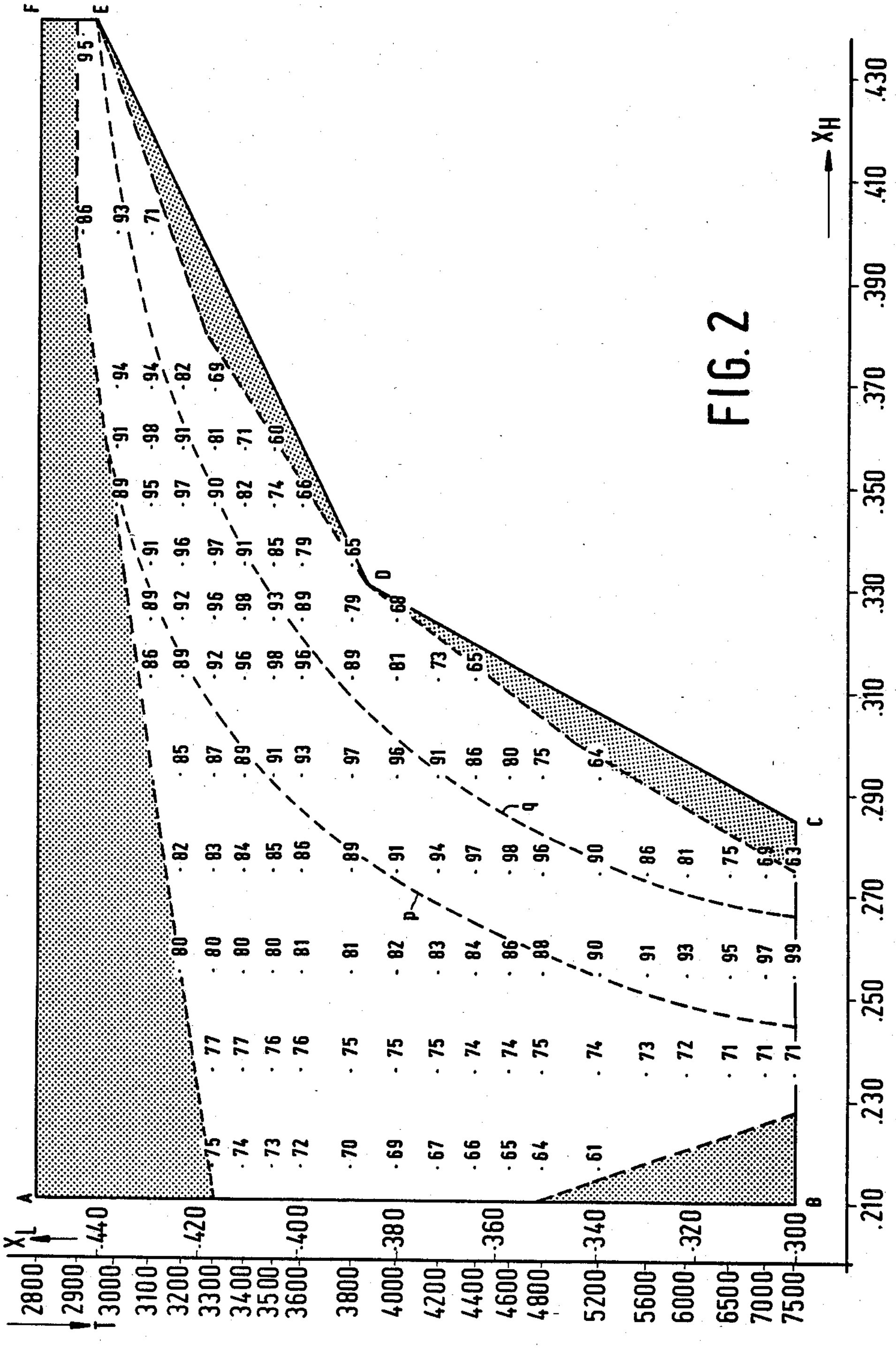
FIG. 2 is a graph showing the relationship of the color temperature of lamps of the invention, the x color coordinate of the lamp and the x color coordinate of the halophosphate to be used for the lamps as well as the value of R9 attainable with the lamp.

A lamp according to the invention is preferred which has a colour point of the emitted radiation $(x_L,y_L)$ and a colour temperature T, where 2800 K.$\leq$T$\leq$7500 K., and which is characterized in that the calcium halophosphate has a colour point of the emitted radiation $(x_H,y_H)$ where $0.210 \leq x_H \leq 0.440$ and the combination $x_H$T, lies in the region of the graph of FIG. 2 indicated by the hexagon ABCDEF, and in that the colour point of the radiation emitted by the materials a and b together lies in the colour triangle on the connection line of $(x_H, y_H)$ and $(x_L,y_L)$.

Figure 1:
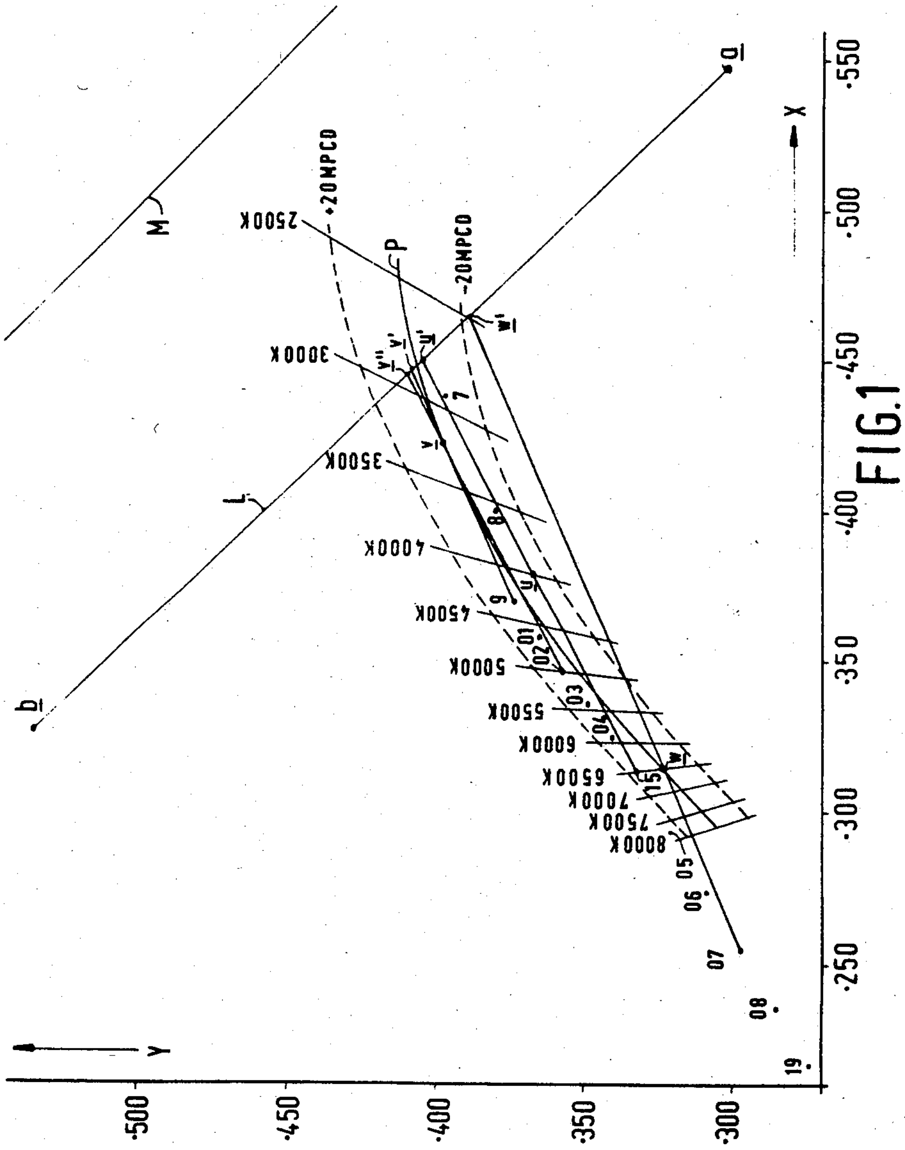
FIG. 1 is a graph showing a part of the color triangle in the (x, y) color coordinate plane.

For explanation, reference is now made to FIG. 1 of the drawing. In this Figure, a part of the colour triangle in the (x,y) colour coordinate plane is shown. The x coordinate of the colour point is plotted on the abscissa and the y coordinate on the ordinate. Of the side of the colour triangle itself, on which the colour points of monochromatic radiation are located, only the part designated by M is visible in FIG. 1. FIG. 1 shows for colour temperatures of approximately 2500 to 8000 K. the Planckian locus indicated by P. The dotted curves indicated by +20 MPCD and −20 MPCD comprise the colour points of radiation which are located at a distance of 20 MPCD above and below the curve P, respectively. Colour points having a constant colour temperature are located on lines intersecting the curve P. A number of these lines are drawn and indicated with the associated colour temperature: 2500 K., 3000 K., . . . 8000 K. Further, in FIG. 1 numerals and letters designate the colour point of a number of lamps and luminescent materials. In the present description and the appended claims the colour point of a luminescent material is to be understood to mean the colour point of a low-pressure mercury vapour discharge lamp having a length of approximately 120 cm and an inner diameter of approximately 24 mm and being operated with a power consumption of 36 W, which lamp is provided with a luminescent layer which only comprises the said luminescent material, the layer thickness being chosen to have an optimum value as to the relative luminous flux. Therefore, with the colour points of luminescent materials, the influence of the visible radiation emitted by a low-pressure mercury vapour discharge lamp itself is invariably taken into account. It should be noted that the magnitude of the efficiency of the luminescent material still slightly influences the location of the colour point. The use of the luminescent materials in low-pressure mercury vapour discharge lamps other than the lamp of the said 36 W-type will generally give rise to only a very small shift of the colour points with respect to those shown herein. In FIG. 1, a denotes the colour point of a red-luminescing Ce- and Mn-activated metaborate having the colour coordinates (x,y)=(0.546; 0.301). b denotes the colour point of a green-luminescing Tb-activated material.

With the materials a and b, all the colour points on the connection line L of a and b can be reached. The location of the colour point lying on the line L of lamps provided with only the materials a and b is invariably determined by the relative quantum contributions of the materials a and b to the radiation emitted by the lamp. The distance of the colour point of the lamp from the point b divided by the distance between the points a and b is proportional to the relative quantum contribution of the material a and to the relative luminous flux (lm/W) supplied by the material a if it is provided in the lamp as the only luminescent material, and is further inversely proportional to the y coordinate of the colour point of the material a. An analogous relation holds for the distance of the colour point from the point a. With the use of given materials a and b of which the relative luminous flux and the y coordinate are consequently defined), therefore only the relative quantum contributions determine the colour point of the lamp. For these materials a and b, the required relative quantum contributions are then known if a given colour point of the lamp is desired. These quantum contributions are in the first place a measure for the quantities of the materials a and b to be used. When fixing these quantities, the quantum efficiency and the absorption of exciting radiation of the materials a and b and further factors, such as, for example, the grain size of the materials used, should be taken into account. If luminescent layers are used which do not form a homogeneous mixture of the materials a and b, especially if the materials are provided in separate juxtaposed layers, great differences may of course occur in the absorptions of exciting radiation by the materials a and b. As a result, with the same relative quantum contributions, the relative quantities of the materials a and b may greatly differ from those with the use of homogeneous mixtures. It will generally be desirable to check on a few test lamps whether the desired relative quantum contributions have been reached with the choice of the quantities of the luminescent materials.

In the graph of FIG. 1, the colour points are further indicated of a number of usual calcium halophosphates emitting white light and having different colour temperatures (the points 7, 8, 9 and 15) and of blue-luminescing Sb-activated calcium halophosphate (point 19). The colour temperature (and the colour point) of a halophosphate is (are), as is known, determined inter alia by the Sb:Mn ratio. Colour temperatures other than those indicated here can be achieved by variation of the said ratio. However, it is also possible to attain other colour temperatures by using mixtures of halophosphates. Thus, 01, 02, 03 and 04 in FIG. 1 indicate the colour points of mixtures of the materials 15 and 9, while 05, 06, 07 and 08 indicate the colour points of mixtures of the materials 15 and 19. The following Table 1 indicates the colour coordinates and the colour temperature of the said halophosphates. For the mixtures, the relative quantum contribution of the material 15 is further stated.

TABLE 1

| | x | y | T(K) | rel. contribution 15 |
|---|---|---|---|---|
| 7 | 0.437 | 0.397 | 2945 | — |
| 8 | 0.399 | 0.380 | 3565 | — |
| 9 | 0.368 | 0.373 | 4335 | — |
| 15 | 0.312 | 0.332 | 6505 | — |
| 19 | 0.216 | 0.273 | >20000 | — |
| 01 | 0.357 | 0.365 | 4640 | 0.202 |
| 02 | 0.346 | 0.357 | 5000 | 0.404 |
| 03 | 0.334 | 0.349 | 5420 | 0.604 |
| 04 | 0.323 | 0.341 | 5900 | 0.802 |
| 05 | 0.293 | 0.321 | 7800 | 0.803 |
| 06 | 0.274 | 0.309 | 9650 | 0.605 |
| 07 | 0.255 | 0.297 | 12500 | 0.405 |
| 08 | 0.236 | 0.285 | 18200 | 0.204 |

FIG. 1 shows, by way of example, the colour points of a few lamps according to the invention. The lamp designated by u has a colour temperature of 4000 K. and a colour point at a distance of approximately 10 MPCD below the curve P. This lamp has a luminescent layer consisting of a mixture of the materials a, b and c. In this case, the material a is Ce- and Mn-activated rare earth metal metaborate (colour point x=0.546 and y=0.301), the material b is Ce- and Tb-activated rare earth metal metaborate (colour point x=0.324 and y=0.535) and the material c is the calcium halophosphate 15 (T=6505 K.). The colour point u can be reached, as appears from FIG. 1, if the relative quantum contributions of a and b are chosen so that the colour point of the radiation emitted by a and b together (the point u') is located on the connection line of the colour point of the halophosphate (15) used and the point u. The relative quantum contributions of a,b and 15 in this lamp are 0.390, 0.185 and 0.425, respectively. The lamp yields a relative luminous flux of 69 lm/W and has an Ra value of 87 and an R9 value of 84. The lamp designated by v has a colour temperature of 3200 K. (on the curve P) and comprises a mixture of the same materials a and b as in the preceding example together with the halophosphate 9 (T=4335 K.). The relative quantum contributions of a and b are 0.527 and 0.265, as a result of which the point v' is reached. The relative quantum contribution of 9 is 0.208. The point v' is located on the connection line of 9 and v. This lamp yields 73 lm/W and has an Ra=82 and an R9=82. A lamp having the colour point v may also be obtained, for example, as indicated in FIG. 1 with the halophosphate 02. In this case, the relative quantum contributions of a and b have to be chosen to be 0.561 and 0.287, respectively, as a result of which the point v'' is reached. The contribution of 02 is then 0.152. In this case, the lamp yields 71 lm/W and Ra=82 and R9=97. Finally, FIG. 1 also shows, by way of example, the colour point w of a lamp having a colour temperature of 6500 K. (on the curve P). The lamp comprises a mixture of the materials a, b and 07 with relative quantum contributions of 0.273, 0.100 and 0.628, respectively, and yields 63 lm/W with Ra=91 and R9=95.

In the aforementioned preferred embodiment of a lamp according to the invention having a colour point ($x_L$,$y_L$) and a colour temperature T (2800 K.≦T≦7500 K.), a calcium halophosphate is used having a colour point ($x_H$,$y_H$) and the combination $x_H$,T lies in the region of the hexagon ABCDEF of the graph of FIG. 2. As explained above, the colour point of the radiation emitted by the materials a and b together should be located on the connection line of the colour points ($x_H$,$y_H$) and ($x_L$,$y_L$) in order to be able to reach with the lamp the colour point ($x_L$,$y_L$). In the graph of FIG. 2, $x_H$ is plotted on the abscissa. The colour temperature T (in K.) of the lamp according to the invention is plotted on the lefthand side of the ordinate. The x coordinate $x_L$ is plotted on the righthand side of the ordinate, it being noted that the given $x_L$ values only correspond to the associated T values with colour points ($x_L$,$y_L$) on the curve P. It appears from FIG. 2, which halophosphates according to the invention are preferably used if a lamp should be manufactured which has a desired colour temperature T. The region ABCDEF found is determined by the following ($x_H$;T) values:

| | | |
|---|---|---|
| A = (0.210; 2800) | B = (0.210; 7500) | C = (0.285; 7500) |
| D = (0.330; 3875) | E = (0.440; 2950) | F = (0.440; 2800). |

The region ABCDEF also comprises the possible combinations $x_H$;T for lamps having a colour point located near the curve P. If these combinations are limited to colour points ($x_L$,$y_L$) on the curve P itself, especially the portion not hatched in gray of the region ABCDEF is applicable. The grey area at AF is more particularly applicable to lamps according to the invention having a colour point located comparatively far below the curve P (down to −20 MPCD). Suitable combinations for these lamps are also found in the gray portion at CD. For such lamps having a colour point below the curve P, however, especially the grey area at the corner B does not comprise any suitable $x_H$,T combinations. Furthermore, lamps according to the invention having a colour point at approximately −20 MPCD cannot be obtained with halophosphates with $x_H$ larger than approximately 0.375. The grey area at AF is less suitable for lamps having a colour point above the curve P. and the less so with comparatively large deviations (up to +20 MPCD). With a distance of +20 MPCD there are no suitable combinations for lamps having a colour temperature below approximately 3500 K. On the contrary, the grey area at B can be used suitably for such lamps having a colour point above the curve P, especially colour points comparatively far above the curve P (up to +20 MPCD). It is found that the grey area at DE can be suitably used for lamps with a small deviation of the colour point above the curve P (up to approximately +10 MPCD).

Of a large number of lamps according to the invention, the $x_H$,T combination is indicated in the graph of FIG. 2 with a point in the area not hatched in grey of the hexagon ABCDEF. At each point a number indicates the value of R9 attainable with these lamps in case the colour points ($x_L$,$y_L$) of these lamps are all located on the curve P. It should be noted that for all the $x_H$,T combinations shown the Ra value is at least 80. The calcium halophosphates to be used in these lamps are the same as those whose colour point is indicated in FIG. 1. If now a lamp according to the invention having a given colour temperature T should be manufactured, it can be read from FIG. 2 which possibilities are offered by the various halophosphates. When such a lamp is optimized, the value of R9 possibly attainable is of course important. However, there are also other considerations which play a part, such as the cost of the luminescent materials to be used, the desired relative luminous flux of the lamp and the like. For a given value of T, the lamp will comprise a relatively larger quantity of calcium halophosphate as the $x_H$ value is chosen to be higher so that it will be generally cheaper and will have a slightly higher relative luminous flux. However, an excessively high $x_H$ value is at the expense of the value of R9. It has been found that optimized lamps (having a colour point on the curve P) are obtained with $x_H$,T combinations in the region bounded by the dotted lines p and q.

If now at a given desired value of T for a lamp a choice has been made as to the calcium halophosphate to be used, through the desired value T, the desired colour point ($x_L$,$y_L$) and the colour point ($x_H$,$y_H$) of the chosen halophosphate it can be ascertained in the manner indicated in the explanation of FIG. 1, which colour point the combination of the luminescent materials a and b should have. If specific materials a and b have been chosen, it is possible to determine in the manner indicated above the relative quantum contributions of these materials a and b. Subsequently, the relative quantum contribution of the chosen calcium halophosphate is determined in an analogous manner. Finally, the relative quantities of the luminescent materials a, b and c are determined with reference to the relative quantum contributions found, as indicated above.

Examples of lamps in accordance with the invention will now be described more fully with reference to FIG. 3, which is a diagrammatic longitudinal section of a low-pressure mercury vapour discharge lamp, and with reference to specific compositions of luminescent layers and measurements on lamps provided with these layers.

Figure 3:
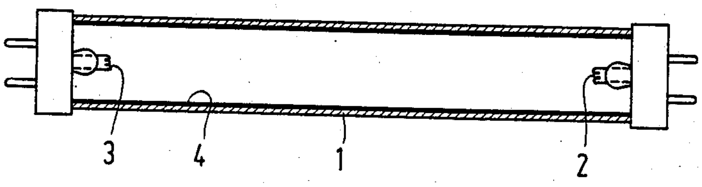
FIG. 3 is a diagrammatic longitudinal section of a low-pressure mercury vapor discharge lamp of the invention.

In FIG. 3, reference numeral 1 designates the glass wall of a low-pressure mercury vapour discharge lamp according to the invention. At the ends of the lamp are disposed electrodes 2 and 3, between which the discharge takes place during operation of the lamp. The lamp is provided with a rare gas, which serves as ignition gas, and further with a small quantity of mercury. The lamp has a length of 120 cm and an inner diameter of 24 mm and is intended to consume during operation a power of 36 W. The wall 1 is coated on the inner side with a luminescent layer 4 comprising the luminescent materials a, b and c. The layer 4 may be applied in a usual manner to the wall 1, for example, in the form of a suspension comprising the luminescent materials.

The following examples relate to lamps of the kind described with reference to FIG. 3 (of the 36 W-type). In these examples, luminescent metaborates (borate 1 to borate 4 inclusive) are used, which contain both Mn and Tb, so that both the red $Mn^{2+}$ emission and the green $Tb^{3+}$ emission can be supplied by one material. As calcium halophosphates use is made of two white luminescing halophosphates (halo 9 and halo 15) and a blue-luminescing Sb-activated calcium halophosphate (halo 19). The formulae of these materials are given in Table 2.

TABLE 2

| material | formula |
|---|---|
| borate 1 | $Ce_{0.2}Gd_{0.6}Tb_{0.2}Mg_{0.9575}Mn_{0.0425}B_5O_{10}$ |
| borate 2 | $Ce_{0.2}Gd_{0.6}Tb_{0.2}Mg_{0.955}Mn_{0.045}B_5O_{10}$ |
| borate 3 | $Ce_{0.2}Gd_{0.6}Tb_{0.2}Mg_{0.97}Mn_{0.03}B_5O_{10}$ |
| borate 4 | $Ce_{0.2}Gd_{0.6}Tb_{0.2}Mg_{0.9644}Mn_{0.0356}B_5O_{10}$ |
| halo 9 | $Ca_{9.524}Cd_{0.04}(PO_4)_6F_{1.73}Cl_{0.226}$; $Sb_{0.09}Mn_{0.186}$ |
| halo 15 | $Ca_{9.641}Cd_{0.025}(PO_4)_6F_{1.584}Cl_{0.36}$; $Sb_{0.09}Mn_{0.084}$ |

TABLE 2-continued

| material | formula |
|---|---|
| halo 19 | $Ca_{9.80}(PO_4)_6F_{1.94}$; $Sb_{0.12}$ |

In order to determine the properties of each of these materials, lamps were first manufactured (36 W) which were provided only with the relevant luminescent material. The relative luminous flux η(lm/W), the colour temperature T (K.), the colour point (x,y) and the colour rendering indices Ra and R9 were measured. The results are indicated in Table 3.

TABLE 3

| material | η | T | x | y | Ra | R9 |
|---|---|---|---|---|---|---|
| borate 1 | 68 | 2680 | 0.453 | 0.403 | 80 | 82 |
| borate 2 | 63 | 2460 | 0.465 | 0.388 | 82 | 82 |
| borate 3 | 73 | 3250 | 0.431 | 0.422 | 78 | 90 |
| borate 4 | 71 | 2960 | 0.443 | 0.412 | 79 | 83 |
| halo 9 | 83 | 4335 | 0.368 | 0.373 | 62 | −90 |
| halo 15 | 70 | 6505 | 0.312 | 0.332 | 77 | −36 |
| halo 19 | 57 | >20000 | 0.216 | 0.273 | 59 | −126 |

EXAMPLE 1

A lamp was provided with a luminescent layer comprising a mixture of 12% by weight of halo 9 and 88% by weight of borate 1. The weight of the luminescent layer in the lamp was 4.1 g. Measurements on the lamp included the colour temperature T (in K.), the colour point (x,y), the deviation of the curve P (ΔP in MPCD), the colour rendering indices Ra and R9 and the relative luminous flux (in lm/W) after 0, 100, 1000 and 2000 operating hours of the lamp ($\eta_0$, $\eta_{100}$, $\eta_{1000}$ and $\eta_{2000}$, respectively). The results of the measurements are indicated in Table 4.

EXAMPLE 2

A lamp was provided with a luminescent layer (5.74 g) comprising a mixture of 4% by weight of halo 15, 50% by weight of borate 2 and 46% by weight of borate 3. The measurements on this lamp are indicated in Table 4.

EXAMPLE 3

A lamp was provided with a luminescent layer (5.78 g) comprising a mixture of 9.5% by weight of halo 9, 51,5% by weight of borate 2 and 39% by weight of borate 3. See Table 4 for the measurements on this lamp.

EXAMPLE 4

A lamp was provided with a luminscent layer comprising a mixture of 21% by weight of halo 15 and 79% by weight of borate 1. The measuring results are stated in Table 4.

EXAMPLE 5

A lamp was provided with a luminescent layer (4.75 g) comprising a mixture of 45% by weight of halo 15 and 55% by weight of borate 1. Measurements of this lamp yielded the values stated in Table 4.

EXAMPLE 6

A lamp was provided with a luminescent layer (4.55 g) comprising a mixture of 28% by weight of halo 9, 18% by weight of halo 19 and 54% by weight of borate 1. The measuring results for this lamp are also stated in Table 4.

EXAMPLE 7

A lamp was provided with a luminescent layer (5.51 g) comprising a mixture of 45% by weight of halo 15 and 55% by weight of borate 4. The results of measurements on this lamp are stated in Table 4.

TABLE 4

| example | T | x | y | ΔP | Ra | R9 | $\eta_0$ | $\eta_{100}$ | $\eta_{1000}$ | $\eta_{2000}$ |
|---|---|---|---|---|---|---|---|---|---|---|
| 1 | 2850 | 0.444 | 0.400 | −7 | 83 | 95 | 68 | 67 | 66 | 63.5 |
| 2 | 2930 | 0.439 | 0.400 | −5 | 81 | 82 | 68 | 67 | 65 | 62 |
| 3 | 2965 | 0.436 | 0.436 | −7 | 83 | 97 | 69 | 68.5 | 67 | 64 |
| 4 | 3300 | 0.411 | 0.382 | −16 | 87 | 98 | 67 | — | — | — |
| 5 | 3790 | 0.386 | 0.369 | −14 | 87 | 85 | 66 | — | — | — |
| 6 | 3860 | 0.383 | 0.369 | −14 | 87 | 86 | 69 | 67 | 66 | 64 |
| 7 | 4230 | 0.371 | 0.368 | −2 | 84 | 66 | 70 | 69 | 67 | 64 |

By way of comparison, reference is finally made to the fact that the known lamps having a very satisfactory colour rendition (which lamps comprise a luminescent strontium orthophosphate) have at colour temperatures of approximately 3000 and 4000 K., respectively, an Ra of the order of 85 and 95, respectively, and an R9 of the order of 65 and 95, respectively. The relative luminous flux of these known lamps is only 55 and 50 lm/W, respectively. Therefore, it appears that with lamps in accordance with the invention a gain in relative luminous flux can be attained of the order of 15 to 30%. Furthermore, the maintenance of the luminous flux during the lifetime for the lamps according to the invention (especially for the comparatively heavily loaded lamps having a diameter of 24 mm) is much higher than that of the known lamps.

What is claimed is:

1. A low-pressure mercury vapour discharge lamp having a color rendering index R9 of at least 60 and Ra of at least 80, a colour temperature of the emitted white light of at least 2800 K. and a colour point ($x_L$,$y_L$) on or not greater than 20 MPCD from the point on the Planckian curve having the same color temperature, said lamp being provided with a gas-tight radiation-transmitting envelope which contains mercury and a rare gas, and which envelope is provided with a luminescent layer containing a luminescent halophosphate, wherein the luminescent layer comprises
   a. a luminescent rare earth metal metaborate activated by trivalent cerium and by bivalent manganese having a monoclinic crystal structure, whose fundamental lattice corresponds to the formula $Ln(Mg,Zn,Cd)B_5O_{10}$, in which Ln represents at least one of the elements yttrium, lanthanum and gadolinium and in which up to 20 mol.% of the B may be replaced by Al and/or Ga, which metaborate exhibits red $Mn^{2+}$ emission,
   b. a luminescent material which is activated by trivalent terbium and exhibits green $Tb^{3+}$ emission, and
   c. at least one luminescent halophosphate of the group which comprises the calcium halophosphates activated by trivalent antimony and by bivalent manganese and emitting white light, whose colour temperature of the emitted radiation is at least 2900 K., and blue-luminescing calcium halophosphate activated by trivalent antimony.

2. A lamp as claimed in claim 1, wherein the luminescent metaborate a is further activated by trivalent terbium, the metaborate a being at the same time the material b and corresponding to the formula $$(Y,La,Gd)_{1-x-y}Ce_xTb_y(Mg,Zn,Cd)_{1-p}Mn_pB_5O_{10},$$

in which $$0.01 \leqq x \leqq 1-y$$

$$0.01 \leqq y \leqq 0.75$$

$$0.01 \leqq p \leqq 0.30$$

and in which up to 20 mol.% of the B may be replaced by Al and/or Ga.

3. A lamp of claim 1 wherein the luminescent halophosphate is a calcium halophosphate activated by trivalent antimony and by bivalent manganese, emitting white light and whose color temperature of the emitted radiation is at least 2900 K.

4. A lamp as claimed in claim 1, which lamp has a color point of the emitted radiation ($x_L$,$y_L$) and a color temperature T, where 2800 K.≦T≦7500 K., wherein the calcium halophosphate has a color point of the emitted radiation ($x_H$, $y_H$) where $0.210 \leqq x_H \leqq 0.440$ and the combination of $x_H$ and T lies in in the region of the graph of FIG. 2, indicated by the hexagon ABCDEF where A is $x_H=0.210$ and T=2800 K., where B is $x_H=0.210$ and T=7500 K., where C is $x_H=0.285$ and T=7500 K., where D is $x_H=0.330$ and T=3875 K., where E is $x_H=0.440$ and T=2950 K. and where F is $x_H=0.440$ and T=2800 K. and the color point of the radiation emitted by the materials a and b together lies in the color triangle on the connection line of ($x_H$,$y_H$) and ($x_L$, $Y_L$).

5. A lamp as claimed in claim 2, which lamp has a color point of the emitted radiation ($x_L$,$y_L$) and a color temperature T, where 2800 K.≦T≦7500 K., wherein the calcium halophosphate has a color point of the emitted radiation ($x_H$, $y_H$) where $0.210 \leqq x_H \leqq 0.440$ and the combination of $x_H$ and T lies in in the region of the graph of FIG. 2, indicated by the hexagon ABCDEF where A is $x_H=0.210$ and T=2800 K., where B is $x_H=0.210$ and T=7500 K., where C is $x_H=0.285$ and T=7500 K., where D is $x_H=0.330$ and T=3875 K. where E is $x_H=0.440$ and T=2950 K. and where F is $x_H=0.440$ and T=2800 K. and the color point of the radiation emitted by the materials a and b together lies in the color triangle on the connection line of ($x_H$,$y_H$) and ($x_L$, $Y_L$).

* * * * *